United States Patent [19]

Saito et al.

[11] Patent Number: 4,887,345
[45] Date of Patent: Dec. 19, 1989

[54] TURRET APPARATUS

[75] Inventors: Kazuharu Saito; Masao Hiraguri; Sadao Yamada; Junichi Shiozawa, all of Nagano, Japan

[73] Assignee: Kabushiki Kaisha Sankyo Seiki Seisakusho and Toto, Ltd., Japan

[21] Appl. No.: 106,308

[22] Filed: Oct. 9, 1987

[30] Foreign Application Priority Data

Oct. 9, 1986 [JP] Japan .................. 61-241782
Oct. 20, 1986 [JP] Japan .................. 61-250578
Oct. 27, 1986 [JP] Japan .................. 61-256481

[51] Int. Cl.⁴ ........................... B23Q 3/157
[52] U.S. Cl. ........................... 29/568; 29/40
[58] Field of Search ............ 29/568, 39, 40, 36, 29/50

[56] References Cited

U.S. PATENT DOCUMENTS

| 3,238,615 | 3/1966 | Leone et al. | 29/568 |
| 3,259,976 | 7/1966 | Bergstrom et al. | 29/568 |
| 3,544,286 | 12/1970 | Oeckl et al. | 29/568 |
| 3,688,387 | 9/1972 | Zettler | 29/568 |
| 3,762,036 | 10/1973 | Goebel et al. | 29/568 |
| 3,780,423 | 12/1973 | Lilienthal et al. | 29/568 |
| 3,999,664 | 12/1976 | Frazier | 29/568 X |
| 4,050,146 | 9/1977 | Geiger | 29/568 |
| 4,563,925 | 1/1986 | Link | 29/568 X |

FOREIGN PATENT DOCUMENTS

| 34735 | 3/1983 | Japan | 29/568 |
| 196146 | 11/1984 | Japan | 29/568 |
| 227345 | 12/1984 | Japan | 29/568 |
| 224542 | 10/1987 | Japan | 29/568 |

Primary Examiner—William Briggs
Attorney, Agent, or Firm—Sughrue, Mion, Zinn, Macpeak and Seas

[57] ABSTRACT

In a turret apparatus with an automatic tool changer a turret head is rotatably provided on a body. The turret head has two main shafts arranged with an interval of 180 degrees about a rotary shaft. The two main shafts being disposed with an intersectional angle of 90 degrees therebetween so as to horizontally direct in an indexing position of the turret head. A rotary center of said turret head is horizontally directed so as to have an intersectional angle of 45 degrees with respect to each of said two main shafts. One of the main shafts is in on the working side when the other main shaft is on the stand-by side. An automatic tool changing arm and a tool stocker are arranged on the horizontal side portion of the main shaft on the stand-by side.

5 Claims, 11 Drawing Sheets

TURRET APPARATUS

BACKGROUND OF THE INVENTION

The present invention relates to a turret apparatus provided with an automatic tool changer in a machine tool, and particularly relates to an arrangement in structure of a turret head and an automatic tool changer.

In an apparatus which is proposed in Japanese Patent Application No. 61-66751 (not a prior art), when one of the main shafts of a turret head is opposed to a work, the other main shaft is indexed into a tool portion while being kept facing upwards, so that a tool socket portion of the main shaft is in the upwrds facing state in changing a tool. Accordingly, not only there is a possibility of entry of dust or the like into the tool socket portion, but the automatic tool changer is required to oppose to the upwards facing main shaft, so that the tool exchanger becomes different from a general one and therefore becomes complicated.

SUMMARY OF THE INVENTION

It is therefore an object of the present invention to provide a turret apparatus with an automatic tool changer in which dust or the like is prevented from entering a tool socket in changing a tool and in which the arrangement of the automatic tool changer is not made specialized but simplified as a whole.

According to the present invention, therefore, a turret head is rotatably supported in a horizontal plane with an angle of 45 degrees relative to the working direction, and two main shafts are provided in the rotational indexing state of 180 degrees about the rotary center of the turret head with an intersectional angle of 90 degrees therebetween so that when a tool of one of the main shafts is indexed into a working position, another tool of the other main shaft is disposed in a tool changing position so as to face a tool in a tool stocker. According to the present invention, therefore, when one tool is indexed into the working position, the other tool is in the tool changing position, so that the working onto a work and the changing of a tool can be carried out at the same time. Further, in that state, both the main shafts are in the horizontal state, so tht entry of dust into a tool socket of the main shaft in changing the tool can be prevented in advance. Further, the main shaft disposed in the tool changing position is indexed so as to be parallel to the tools in the tool stocker, so that the automatic tool changer is not made complicated and can be arranged so as to be a general one.

Another object of the present invention is therefore to make the position of a work head, particularly a main shaft thereof, in a predetermined direction always agree with a tool changing position of a tool stocker so that tool change can be made immediately after completion of necessary cutting work without moving the main shaft in the predetermined direction.

According to the present invention, therefore, an ATC arm is supported in front of a column or the like in the Y-axis direction in a machine tool, and tool stocker is provided so as to be movable by a frame. The frame is moved by a driving source of a work head in the same direction as that of the work head so as to make the position of the work head, particularly the main shaft thereof, always agree with the tool changing position of the ATC arm in the same plane, so that tool change can be made at that position without moving the main shaft in a certain direction after completion of necessary machining. Further, according to the present invention, as the work head is moved to a predetermined working position, the ATC arm and the tool stocker move by the same distance as that of the work head, so that it is made possible to change a tool immediately at any working position. As a result, it is not necessary to index the main shaft again for tool change, so that a time required for tool change can be shortened as much as possible.

Another object of the present invention is to carry out a series of operations of a turret head in the mechanically synchronized condition to simplify the control of the succeeding operations and to shorten the time taken for the series of operations.

According to the present invention, therefore, a driving source of an index-rotating means of the turret head is used for driving the clutch means and the detaining means of the main shaft and the positioning means of the turret head in the mechanically linked state, so that the series of succeeding operations of the turret head are mechanically synchronized.

DETAILED DESCRIPTION OF THE PREFERRED EMBODIMENTS

FIGS. 1 through 4 show the state in which a turret apparatus 1 provided with an automatic tool changer according to the present invention is incorporated in a machine tool 2 of the three dimensional numeral control (N.C.) type.

The turret apparatus 1 is provided with a turret head 4 rotatably supported by a body 3. That is, the turret head 4 is rotatably supported by a rotary shaft 5 which is located in a horizontal plane so as to cross, by 45 degrees a horizontal axis, that is, a Z-axis, which is the working direction, so that the turret head 4 is arranged to be indexed about the rotary shaft 5 by a rotational angle of 180 degrees by an indexing motor 6 provided on the body 3 side and an indexing mechanism 7 in the body 3. The turret head 4 is provided with two rotatably supported main shafts 81 and 82 which are disposed with an interval of a rotational angle of 180 degrees about the rotary shaft 5 and with an intersectional angle of 45 degrees relative to the rotary shaft. In other words, the main shafts 81 and 82 are disposed in the same plane with an angle of 90 degrees therebetween. The main shafts 81 and 82 have tool sockets at their respective top ends 4 and various tools 10a are removably fixed in the tool sockets respectively. A main-shaft motor 9, which is a driving source of the main shafts 81 and 82, is housed in the body 3 in the Z-axis direction so as to transmit rotary force to only the main shaft 81 or 82 which is in the Z-axis direction.

In the machine tool 2, on the other hand, in order to guide the turret apparatus 1 in the three-dimensional directions, a slider 12, a feeding unit 13, a guide 14, a work feeding unit 15, and a column 16 are assembled so that the turret apparatus 1 can be slidingly guided on a bed 11 by the slider 12 and the feeding unit 13 in the X-axis direction, by the guide 14 and the work feeding unit 15 in the Z-direction, and by the column 16 in the Y-direction. A slider 18 is supported by the column 16 on the front side of the column 16 so that the slider 18 can be slidingly guided in the Y-axis direction by a counter balancer 17 and a feeding unit 19, the turret head 4 being supported by the slider 18 and the body 3. The feeding unit 13, the work feeding unit 15, and the feeding unit 19 are arranged so as to be controlled under a predetermined program by a sequence N.C. unit 20 disposed on one side surface of the bed 11.

A tool stocker 22 is supported by the column 16 on one side surface of the column 16 and arranged so as to be made movable upwards/downwards by a slider 23 and a counter balancer 24, and a tool changing arm 25 is held between the tool stocker 22 and the main shaft 82 in the tool changing position by a horizontal shaft 26 on the slider 23 side in the condition that the tool changing arm 25 can be indexed by a driving means 27 successively by 180 degrees. The tool stocker 22 is supported by a horizontal support shaft 21 on the slider 23 side so as to be indexed by an indexing mechanism 27, and a plurality of tools 10a are removably received in tool pots 35 of the tool stocker 22 at the outer circumferential portion of the tool stocker 22. Tools 10a are held by the tool changing arm 25 in the opposite end portions of the tool changing arm 25 similarly to the conventional one.

A work 29 is fixed by a clamp means 32 in a positioned state on a side surface of a vertical pallet 30 and fed to a working position by a pallet changer 31 disposed on the bed 11. A tip conveyor 33 is provided under the working position and extended from a position under the bed 11 to the upper surface of a tip bucket 34.

First, the work 29, an object to be worked, is fixed in position on the pallet 30 by the clamp means 32 of the pallet 30 and is fed to the working position by the pallet changer 31.

On the other hand, the two main shafts 81 and 82 of the turret head 4 are rotated about the rotary shaft 5 by 180 degrees by the indexing motor 6 and located in a horizontal plane. At that time, one of the main shafts, for example 81, is opposed to the work 29 and the other main shaft 82 is in the tool changing position, that is, a stand-by position so as to be in parallel to the tools 10 in the tool stocker 22.

In that state, the machine tool 2 is controlled under the three-dimensional numeral control so as to be indexed to the working position for the work 29 so that first working is carried out onto the work 29 with the tool 10 by the rotation of the main shaft 81 while feeding the work 29 in the Z-axis direction by the work feeding unit 15. In carrying out the first working, the indexing mechanism 27 rotates the tool stocker 22 so as to index the tool 10a to be used in the next working into the tool exchanging position.

During the working, the tool changing arm 25 grasps by its one portion the tool 10a of the main shaft 82 being in the stand-by position while grasping by its other portion the tool 10a being indexed in the tool take-out-/in position in the tool stocker 22. Thereafter, the driving means 28 moves the shaft 26 in the axial direction of the shaft 26 so as to advance the tool changing arm 25 to thereby draw out the tool 10a from the main shaft 82 and simultaneously take out a tool 10a form one of the tool pots 35 of the tool stocker 22 where the tool 10a has been held. Thereafter, the driving means 28 rotates the tool changing arm 25 by 180 degrees and then moves the shaft 26 backwards in the axial direction to thereby store the tool 10a drawn out of the tool socket of the main shaft 82 into the empty tool pot 35 of the tool stocker 22 and simultaneously enter the tool 10a newly taken-out of the tool stocker 22 into the tool socket of the main shaft 82 being in the stand-by position. Of course, in that state, the main shaft 82 keeps the tool 10a entered in the tool socket in the state retained by engaging means such as a pull-stat or the like.

In the meanwhile, upon the completion of the first working by the main shaft 81, the indexing motor 6 and the indexing mechanism 7 rotate the turret head 4 by 180 degrees about the rotary shaft 5 so as to make the new tool 10a of the main shaft 82 oppose to the work 29 to thereby carry out a second working. Thereafter, similarly to the case described above, the indexing mechanism 27 rotates the tool stocker 22 so as to index the tool 10a to be used for the next working in the tool changing position, and the driving means 28 operates the tool changing arm 25 to enter the tool 10a used for the first working into the empty position of the tool stocker 22 and enter the new tool 10a required for the next working into the tool socket of the main shaft 81 being in the stand-by position. Thus, the tool change is performed so as to be ready for the next working.

Thus, necessary working are succeedingly continuously carried out selectively by the main shafts 81 and 82 being in the working position, and in the meantime the tool 10a is automatically exchanged with a new one for the next working by the tool changing arm 25 succeedingly. In changing a tool, the main shaft 81 or 82 in the stand-by position and the shaft 26 of the tool changing arm 25 must be set at the same height. Accordingly, the sequence N.C. unit 20 moves the slider 23 in the Y-axis direction to make control so as to make the main shaft 81 or 82 in the stand-by position, the shaft 26 of the tool changing arm 25, and the support shaft 21 of the tool stocker be always even in height to each other, when the height of the body 3 is set. Thus, when the main shaft 81 or 82 is in the indexed position for the change of the tool 10a, the main shaft 81 or 82 is always in the horizontal state, so that dust or the like is hard to enter the inside of the tool socket of the main shaft 81 or 82. Of course, corresponding to this state, also the space for housing the tool stockers 22 is always horizontally formed, so that entry of dust into the inside of the housing space is minimized.

Tips or the like generated in working are conveyed by the tip conveyer 33 into the tip bucket 34.

According to the present invention, the two main shafts are located in the same plane containing the rotary shaft of the turret head, and when one of the main shafts is indexed into the working position in the horizontal posture, the other main shaft is in the stand-by position for the tool change also in the horizontal posture, so that the rate of entry of tips into the tool sockets of the main shafts is made low. Further, the tool changing arm, the tool stocker, etc. for the automatic tool change are supported by the horizontal shaft on the side surface of the machine tool, so that a general automatic tool exchanger may be used to that the arrangement can be made simple correspondingly in comparison with the arrangement of the upwards facing type.

Further, while working is performed by one main shaft, the other main shaft is always indexed in the stand-by position where the tool can be changed, and in the meantime the tool change is automatically performed, so that loss time is eliminated and the apparatus can be flexibly applied to various kinds of works.

Generally, an automatic tool changer of the kind described above is attached together with an arm for automatic tool changing (ATC) at a fixed portion such as a bed at a side position of a column. On the other hand, a main shaft is three-dimensionally movably attached, and arranged to be guided to a working position so as to perform necessary machining onto a work by rotational movement for cutting. In that case, the working position of the main shaft does not always agree with a tool changing portion of the automatic tool changer. Accordingly, generally, after completion of necessary machining, the main shaft is guided by numerical control to the tool changing position where the main shaft faces the ATC arm so as to be ready for automatic tool change.

However, the main shaft must be moved to a tool changing position every time of tool change, so that waste of time is caused to thereby lower the working efficiency.

In order to solve this problem, FIGS. 5 through 11 show the arrangement of the automatic tool changer according to the present invention.

Figure 1:
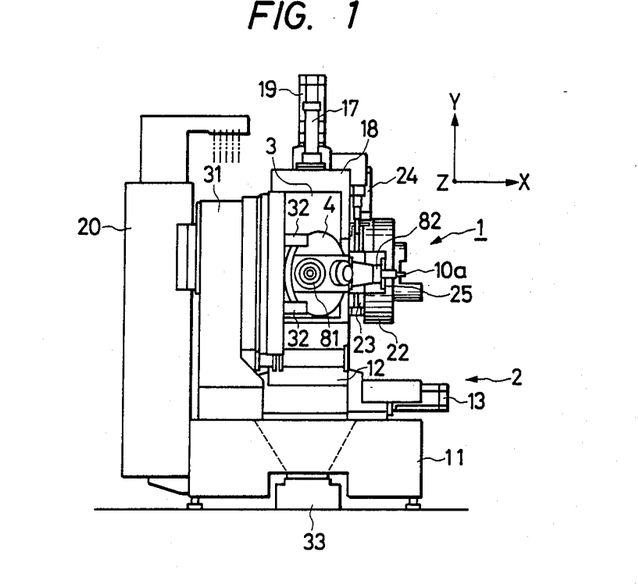
FIG. 1 is a plan view showing the turret apparatus with the automatic tool changer according to the present invention.
Figure 2:
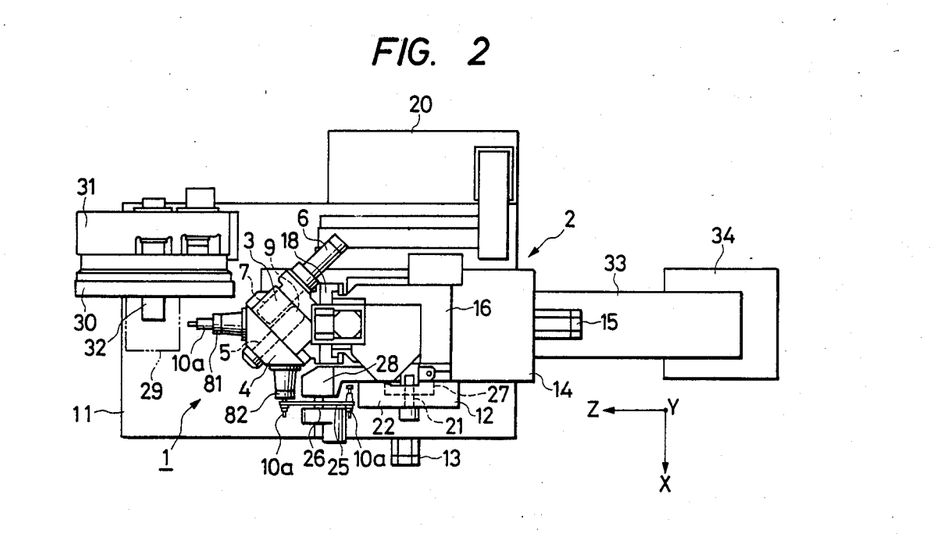
FIG. 2 is a front view of the apparatus.
Figure 3:
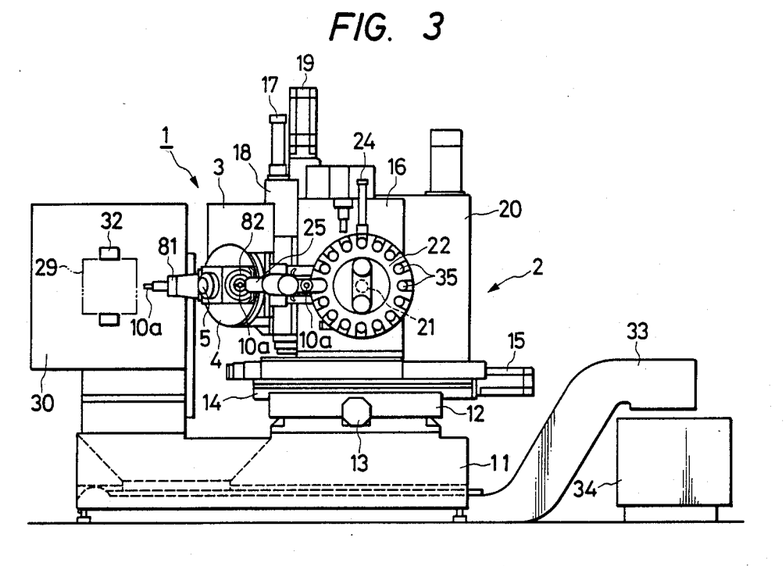
FIG. 3 is a side view of the apparatus.
Figure 4:
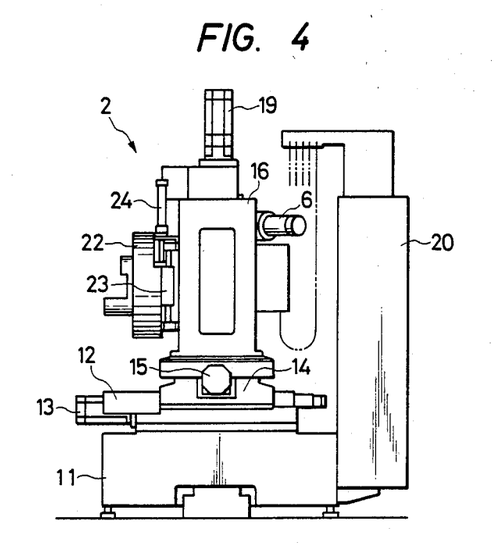
FIG. 4 is a back view of the apparatus.
Figure 5:
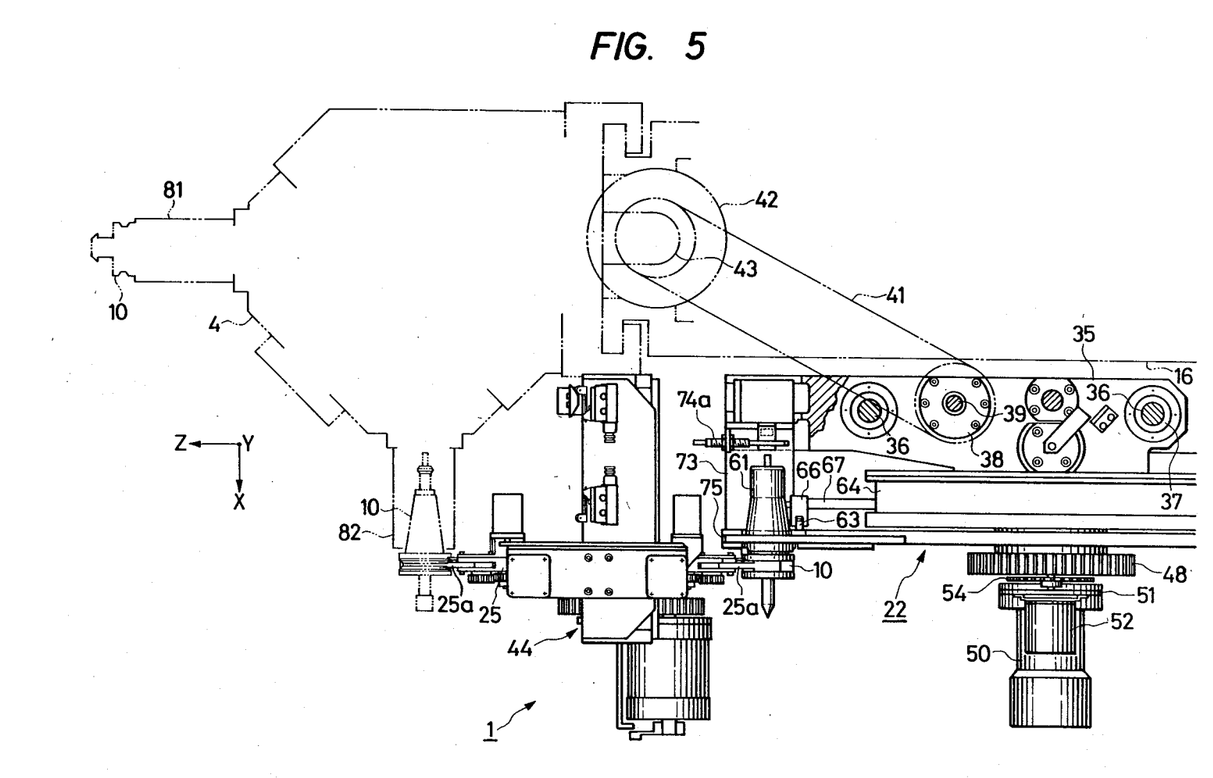
FIG. 5 is a partially broken plan view of an automatic tool changer of the present invention.
Figure 6:
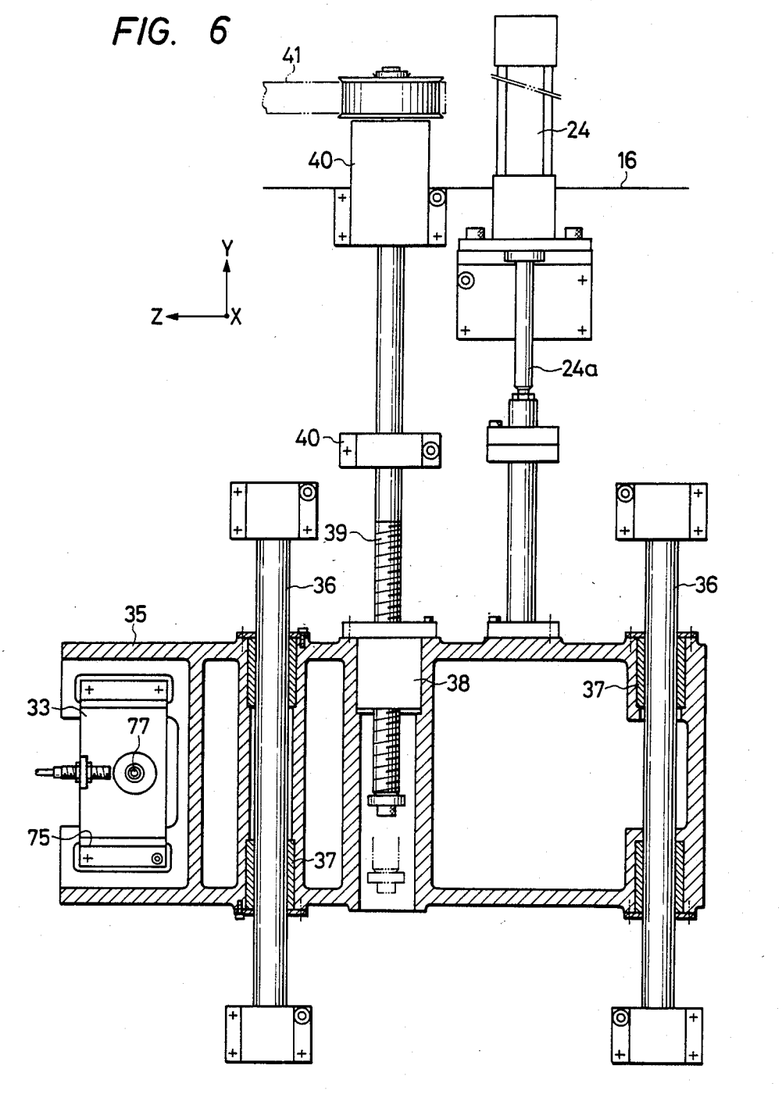
FIG. 6 is a partially broken front view of the supporting portion of the frame of the automatic tool changer.

A turret apparatus 1 provided with the automatic tool changer is incorporated into a machine tool in such a manner that the turret apparatus 1 can be moved in the Y-axis direction by a frame 35 in front of a Y-axis column 16 of a machine tool. That is, as shown in FIGS. 5 and 6, the frame 35 is movably supported by bushes 37 for upwards/downwards slide-guiding the frame relative to a pair of parallel guide bars 36 fixed onto the Y-axis column 16, and is connected to a Y-axis direction feed screw 39 at a position of a feed nut 38 fixed to the frame 35 in the condition of a screw pair. Further, the feed screw 39 is rotatably supported by an upper and a lower bearing 40 attached to the Y-axis column 16, and arranged to be driven by a reduction-gear-provided motor 42 through a timing pulley belt 41. The reduction-gear-provided motor 42 functions not only as means for moving the frame 35, but as a driving source for a feed guide unit 43 for moving a turret head 4 in the Y-axis direction at the side of the Y-axis column 16. Further, the frame 35 is retained by a piston rod 24a of a counter balancer 24 at a center of gravity of the frame 35 so as to reduce the load of the reduction-gear-provided motor 42.

An ATC arm unit 44 is fixed on the Y-axis column 16, and a tool stocker 22 is held on the frame 35 at the same height as that of the ATC arm unit 44. The ATC arm unit 44 retains an ATC arm 24 in a manner so that the ATC arm 25 can advance/retreat in the X-axis direction and can rotate about a center of axis of the ATC arm by 180 degrees. The ATC arm 25 retains a tool holder 10 disposed on a main shaft 82 of the turret head 4 and another tool holder 10 supplied together with a tool pot 61 from the tool stocker 22, by pawls 25a at one and the other tip ends of the ATC arm 25.

Figure 7:
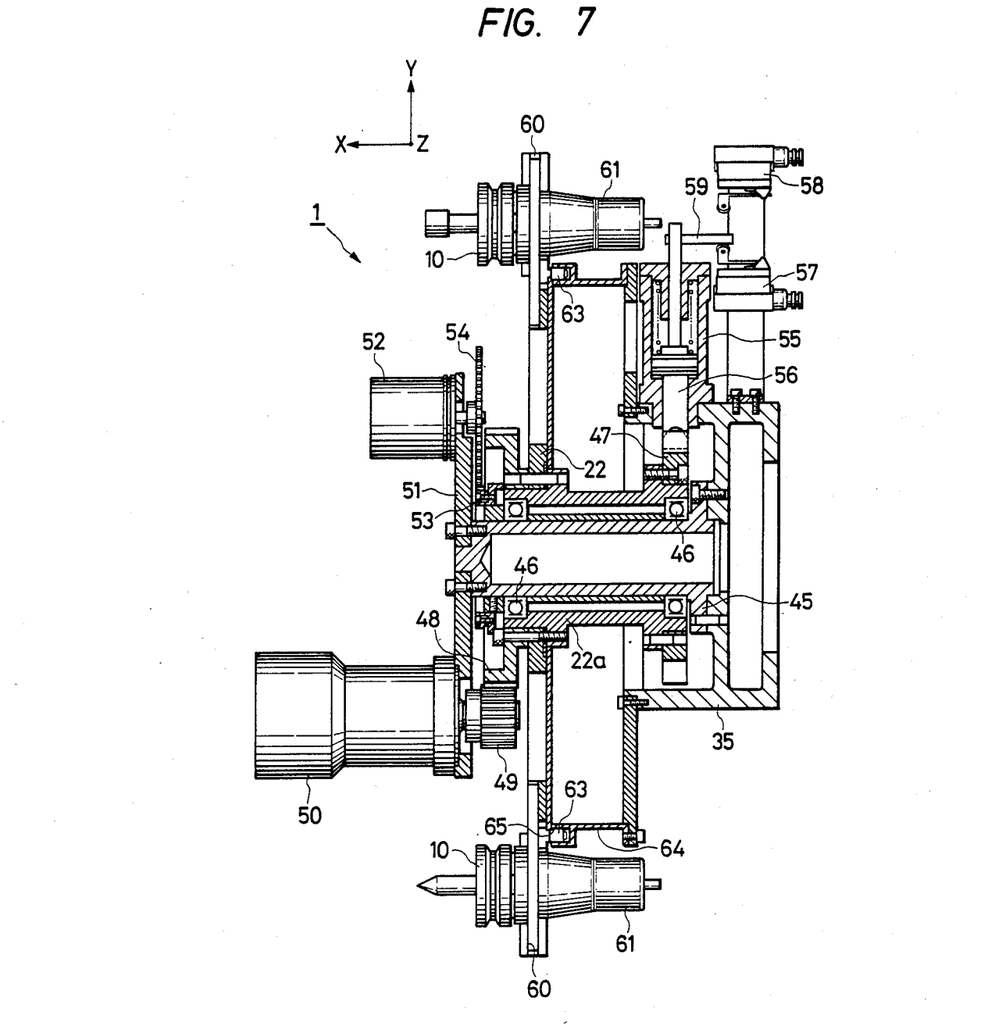
FIG. 7 is a vertical cross section of the tool stocker.
Figure 9:
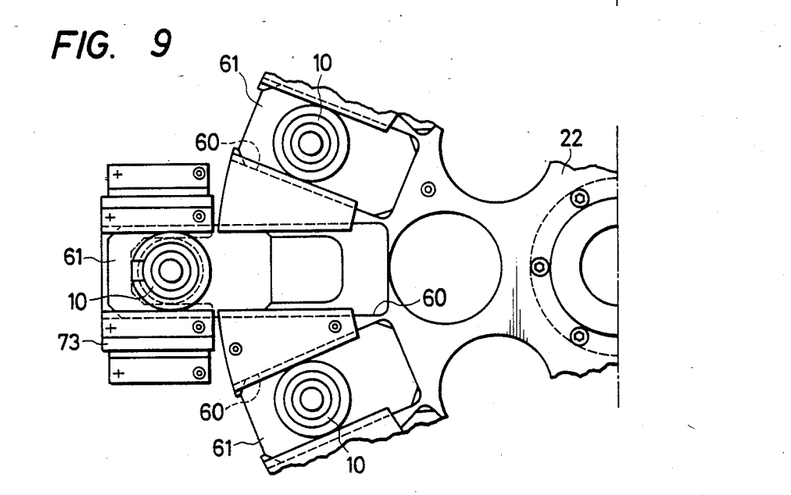
FIG. 9 is a front view showing a part of the tool stocker.

The tool stocker 22 is shaped, for example, disk-like as shown in FIGS. 7 and 9, and rotatably supported at its cylindrical shaft 22a through a ball bearing 46 by a fixed shaft 45 attached onto the front of the frame 35 in the X-axis direction, so that the tool stocker 22 can be indexed into a predetermined rotary position by a gear 48 fixed at the front end of the tool stocker and a gear 49 gearing with the gear 48 provided at an output side of a reduction-gear-provided motor 50. The reduction-gear-provided motor 50 is a driving source for indexing the tool stocker 22, and fixed at the front side thereof to the front end surface of the fixed shaft 45 a base plate 51. Further, the rotational position of the tool stocker 22 is electrically detected by an encoder 52 attached to the base plate 51 through gears 53 and 54. Further, a star wheel 47 is coaxially attached to the rear end of the tool stocker 22 and the indexing groove portion at the outer periphery of the star wheel 47 corresponds to a piston rod 56 of a return-type stop cylinder 55 attached to the frame 35. Further, the position of the piston rod 56 is detected on the basis of the relation of contact between a dog 59 provided at the piston rod 56 side and each of two limit switches 57 and 58 provided at the frame 35 side.

Figure 10:
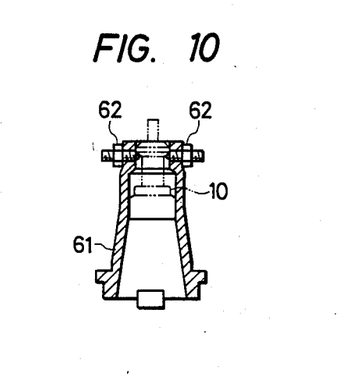
FIG. 10 is a cross section showing a tool pot.
Figure 11:
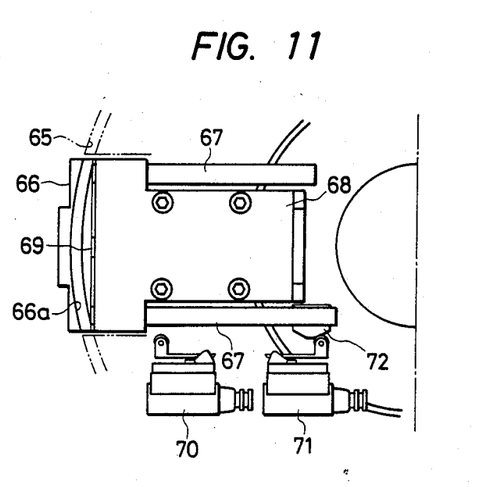
FIG. 11 is a front view showing a guide member.

A number of supporting grooves 60 are radially formed in an outer peripheral portion of the tool stocker 22, and tool pots 61 are retained removably in the direction away from the center of the tool stocker 22 in the inside of the respective supporting grooves 60. Further, each of the tool pot 61 accommodates therein the tool holder 10 removably in the X-axis direction by a pair of ball plungers 62 as shown in FIG. 10. The tool pots 61 are made face the inside of a true-circular guide groove 65 of a guide frame 64 fixed on the front of the frame 35 at a portion of a roller 63 attached to the rear surface of the frame 35 so as to be prevented from coming off in the direction away from a rotary center of the tool stocker 22. The guide frame 64 is in a discontinuous state at a taking in/out position of the tool holders 10, and is in a state that the guide frame 64 can be connected to a portion of a circular-arc guide groove 66a of a guide member 66. As shown in FIG. 11, the guide member 66 is supported by a pair of parallel guide rods 67 so as to be movable in the radial direction of the tool stocker 22 relative to a guide cylinder 68, and coupled also to a piston rod 69 of the guide cylinder 68. Further, the advancing and retreating positions of the piston rod 69 are detected on the basis of the relation of contact between a dog 72 fixed to another guide rod 67 and each of two limit switches 70 and 71.

Figure 8:
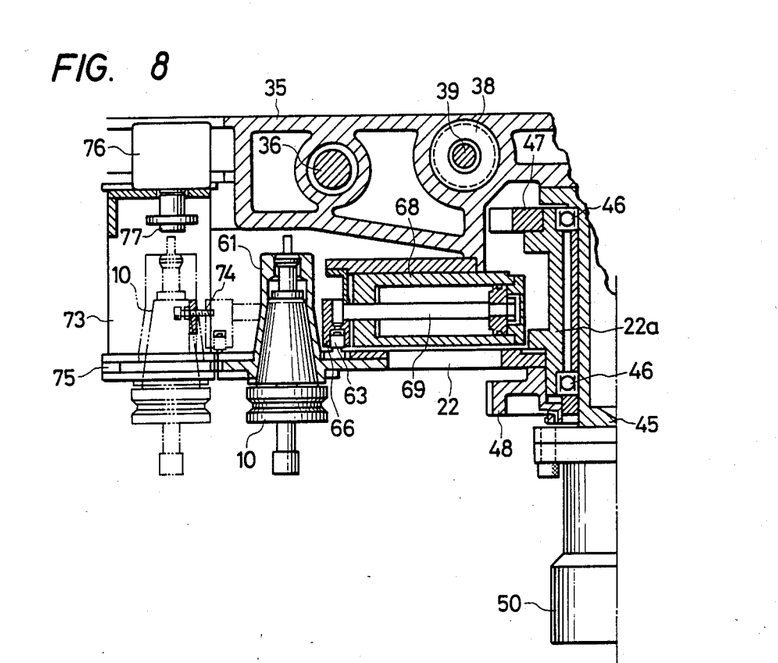
FIG. 8 is a horizontal cross section of the tool stocker at its taking in/out position.

Further, as shown in FIG. 8, the limit of advancing of the guide member 66 is limited by a stopper screw 74 of an intermediate holder 73. The intermediate holder 73 is fixed on the front of the frame. Being positioned at a middle position between the rotary center of the ATC arm 25 and that of the tool stocker 22, the intermediate holder 73 retains the tool pots 61 in a manner so that the tool pots 61 can be taken into/out of a retaining groove 75. The intermediate holder 73 is provided with a push-out rod 77 driven by a push-out cylinder 76 so as to push our a rear end portion of the tool holder 10 provided inside the tool pot 61. The returned position is detected by a sensor 74a.

Next, the tool change is carried out through a sequence of operations as follows.

First, at a point in time when a tool indexing command is given by a numerical control apparatus or the like, the stop cylinder 55 is actuated to make the piston rod 56 of the stop cylinder 55 to retreat from the star wheel 47 to thereby release the tool stocker 22 from its detained state. Next, the reduction-gear-provided motor 50 is actuated so that the rotation of the motor 50 is transmitted to the tool stocker 22 through the gears 49 and 48 to rotate the tool stocker 22 to thereby index desired one of the tool pots 61 into the taking in/out position at a predetermined rotational position while the position of the tool stocker 22 is detected by the encoder 52. After completion of index, the stop cylinder 55 makes the piston rod 56 advance immediately so that the tip end of the piston rod 56 comes into contact with the groove portion of the star wheel 47 to thereby put the tool stocker 22 from the indexing state into the detained state.

At a taking in/out position, the roller portion of the a selected one of the tool pot 61 faces the guide groove 66a of the guide member 66. Thus, the desired tool pot 61 is indexed to the taking in/out opening, and then the guide cylinder 68 takes in an operational fluid from the outside so that the piston rod 69 is made to advance toward the intermediate holder 73 so as to move the tool pot 61 toward the intermediate holder 73. At that time, the tool pot 61 moves in the direction away from the center of the tool stocker 22 while sliding in the support groove 60 of the tool stocker 22, comes out of the supporting groove 60, moves to the retaining groove 75 of the intermediate holder 73, and then stops at a predetermined position on the basis of the relation of contact between the stopper screw 74 and the guide member 66.

Next, the ATC arm unit 44 change-overs the front end pawl 25a of the ATC arm 25 from its opened state into its closed one to thereby retain the tool holder 10 disposed into its closed one to thereby retain the tool holder 10 disposed inside the tool pot 61 guided to the intermediate holder 73 and retain the tool holder 10 of the main shaft 82 to be changed at the end portion. Next, the ATC arm 25 moves in the direction of the rotary axis, that is, in the X-axis direction to thereby draw out the tool holders 10 retained at the opposite end portions of the arm from the tool pots 61 and simultaneously draw out the tool holder 10 from the inside of the main shaft 82. Arrangement is made such that in the drawing-out operation, the push-out cylinder 76 make the push out rod 77 advance so that the tool holder 10 overcomes the plunger 62 so as to be easily drawn out from the inside of the tool pot 61. Next, the ATC arm 25 rotates by 180 degrees, and then retreats in the rotary axis again so that a new tool holder having been taken out from the tool pot 61 is mounted to the inside of the main shaft 82, while the tool holder 10 taken out of the main shaft 82 is accommodated into the inside of the empty tool pot 61. Next, the main shaft 82 is indexed to a working position so as to carry out necessary cutting operation by feeding movement of the turret head 4. On the other hand, the tool holder 10 accommodated into the inside of the tool pot 61 at the position of the intermediate holder 73 is accommodated into the inside of the empty guide groove 65 of the tool stocker 22 through the reverse operation to that described above.

As apparent from the above description, when the turret head 4 is set at a working position with respect to the Y-axis column 16, also the position of the frame 35 in the Y-axis direction is changed correspondingly, so that the rotary center of the main shaft 82 and the ATC arm 25 and that of the tool stocker 22 are always kept in the same plane and in parallel to each other. Accordingly, upon completion of working, it is not necessary to move the main shaft 82 in the Y-axis direction, and the above-mentioned sequence of operation of the tool changing can be performed with the main shaft kept at its position as it is. Further, the turret head 4 is arranged in such a manner as shown in FIG. 5, and in an embodiment in which two main shafts 81 and 82 are provided about the rotary center of the head 4 and separated at a rotational angle of 180 degrees from each other, while working is carried out by one of the main shafts 81 in the Z-axisl direction, the other main shaft 82 is always indexed into the tool changing position, so that the tool changing operation can be performed in parallel to the working operation.

In the above-mentioned embodiment, the ATC arm unit 44 is fixed on the Y-axis column 16; however, the ATC arm unit 44 may be fixed to the frame 35.

According to the present invention, an ATC arm and a tool stocker are supported by a Y-axis column and a frame, or by a single frame, so that they are moved always in one direction together with a turret head so as to be always in a position where tool changing can be performed, whereby it is not necessary to move the turret head in advance to the tool change position to thereby shorten the time required for the automatic tool change correspondingly. Further, the driving source for indexing the tool stocker is provided at the front side of the tool stocker, that is, in front of the tool pot, so that no large space is required at the rear portion of the tool pot, whereby the tool stocker can be made thin and stably attached at a side of a column or the like of a machine tool.

A turret head of the kind described above requires a series of succeeding operations in connection with the turning movement of the turret head and the driving of a main shaft. The series of succeeding operations are, for example, releasing a clutch of the main shaft and releasing positioning pins of the turret head after stoppage of rotation of the main shaft; engagement of a positioning clutch and locking of the main shaft after operation of detaining the main shaft; and so on.

In the turret head, the series of operations are carried out by exclusive actuators separately, so that not only time delay occurs in signal processing in a process of electric control but accurate sequence control is required because of the synchronization of the operations. Because of such complicated control, time taken for the series of operations of the turret head is prolonged so that the time accounts for a large rate in the working time.

In order to solve such a problem, FIGS. 12 through 16 show an embodiment in which the turret head apparatus 1a according to the present invention is incorporated into a machine tool on the front of a slider 12 in the Y-axis direction of the machine tool through a body 3. The Y-axial slider 12 is supported so as to be movable under numerical control together with the body 3. The body 3 is fixed on the front surface of the Y-axial slider 12 so as to rotatably support a turret head 4 in the form of a frustum of circular cone in a vertical plane of 45 degrees relative to the Z-axis. That is, the turret head 4 is rotatably supported by a central shaft 78 and a bearing 79, the shaft 78 crossing the Z-axis by 45 degrees in a horizontal plane. The central shaft 78 acts also as a clamping cylinder, and houses a clamp piston 80 in the inside thereof in a manner so that the clamp piston 80 is forwardly urged by a spring 83. The clamp piston 80 is provided at its top end with a clamper 84 having a tip end surface being made to face a clamp receiver 85 of the turret head 4. A working fluid for driving the turret head 4 enters one chamber through a tail cover 86 on the body 3 side and a port 86a of the clamp piston 80.

Figure 12:
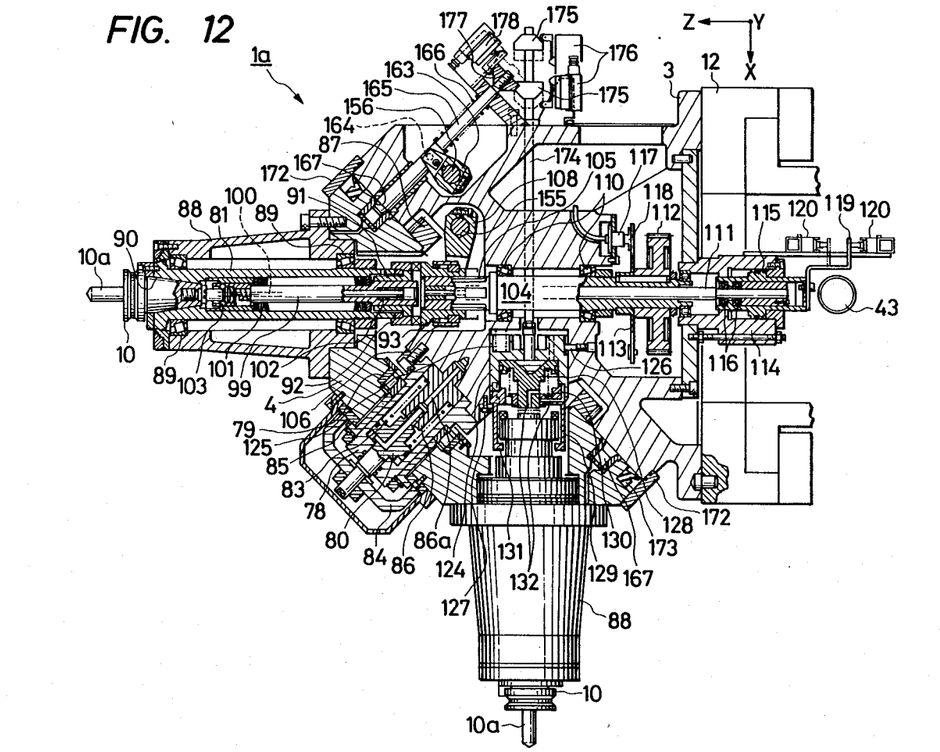
FIG. 12 is a horizontal cross section of the turret head according to the present invention.
Figure 15:
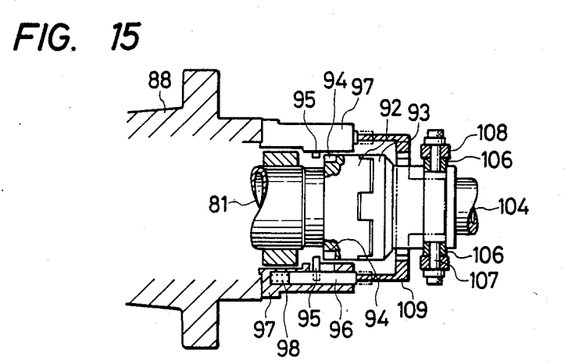
FIG. 15 is a partially broken plan view of clutch means.

The turret head 4 is provided with a gear 87 concentrical to the central shaft 78 on a surface of the turret head 4 opposite to the body 3 and further provided with a plurality of housings 88 at the conical surface side, for example, at intervals of 180 degrees about the central shaft 78 in a horizontal plane, that is, in the X-Z plane. Main shafts 81 are rotatably held in the respective housings 88. Each main shaft 81 is rotatably supported by front and rear bearings 89. The main shaft 81 retains at its front end a tool holder 10 detained in the inside of a tapered socket 90, and is connected at its rear end to one of a pair of clutch members 92 and 93 acting as clutch means through a nut 91. As shown in FIG. 15, the clutch member 92 is arranged so as to fit with lock pins 95 with rotation detent means of the main shaft 81, that is, two diametrically formed lock grooves 94. The lock pins 95 are made slidable in the Z-direction by a rod 96 in a support 97 at the rear end portion of the housing 88, and are urged by springs 98 in the directions relating to the corresponding lock grooves 94.

The main shaft 81 concentrically accommodates in its inside a clamp rod 99 and a recess rod 100 which are urged by springs 101 and 102 respectively in the retreating direction. The clamp rod 99 makes a pull-stat portion of the tool holder 10 be in the detained state by lock balls 103 at the top end portion of the clamp rod 99, and the recess rod 100 enters the inside of the tool holder 10 so as to make an eccentric tool 10a to displace in the direction away from its center.

On the other hand, the clutch member 93 is axially displaceably supported by a spline 105 at a forward end portion of a driving shaft 104 and is connected to an operation lever 108 by a connecting pin 107 through a sliding ring 106 which is split at an annular groove portion. The sliding ring 106 is connected also to a releaser 109 corresponding to the lock pins 95. The driving shaft 104 is rotatably supported by the body 3 through front and rear bearings 110, and arranged to axially slidably support at the inside thereof a recess driving rod 111 and hold at its rear end portion an input gear 112 and a rotary plate 113.

Figure 14:
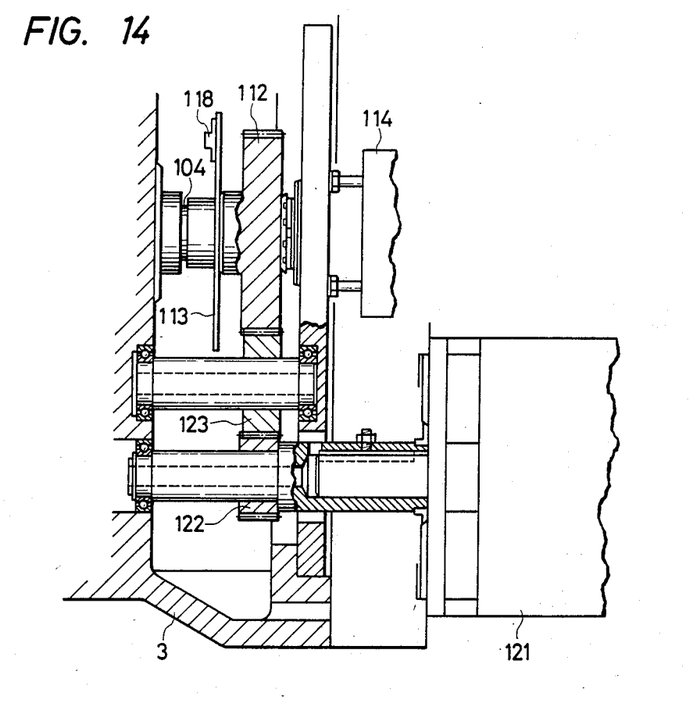
FIG. 14 is a horizontal cross section of means for rotation-driving a main shaft.

The recess driving rod 111 is connected to a piston 115 of a recess cylinder 114 fixed to the rear end portion of the recess driving rod 111 on the side of the body 3 through bearings 116 so as to be rotatable and axially movable. A sensor 117 on the body 3 side detects a dog 118 of the rotary plate 113 in a contactless state so as to detect the rotational position of the driving shaft 104. The advancing and retreating positions of the recess driving rod 111 are detected on the basis of the relation of contact between a dog 119 fixed to the piston 115 and either of two limit switches 120. On the other hand, as shown in FIG. 14, the rotary force of the driving shaft 104 is supplied by a main shaft motor 121 as rotation driving means. That is, the rotation of the main shaft motor 121 is transmitted to the input gear 112 through gears 122 and 123 rotatably supported in the inside of the body 3.

The body 3 is accommodated in such a condition that the body 3 is made movable in the advancing and retreating directions along the axial line of the main shaft 81 located in an automatic tool changing position, that is, a stand-by position, while forwardly urging an unclamp cylinder 124 through a plurality of springs 125 disposed at regular intervals, and that the body 3 is detained from rotation by a rotation-detaining pin 126 and detained from coming off by a pressing plate 127. A piston rod 128 in the unclamp cylinder 124 is urged by a compression spring 130 in the retreating direction between the unclamp cylinder 124 and a drawer 129 so that the top end of the piston rod 128 faces the rear end portion of the main shaft 81 located in the stand-by position. The drawer 129 is projected towards the top end of the main shaft 81 at a position outside the locus of movement of the main shaft 81, and a pair of pawls 131 are formed at the top end of the drawer 129 so as to embrace the opposite shoulder portions of the clutch member 92 in that position. Air paths for cleaning the socket are formed through the unclamp cylinder 124, the piston rod 128, and the drawer 129 so as to communicate to each other. A portion of the piston rod 128 drives two dogs 175 through a connecting rod 174, the two dogs 175 facing two limit switches 176 respectively.

Figure 13:
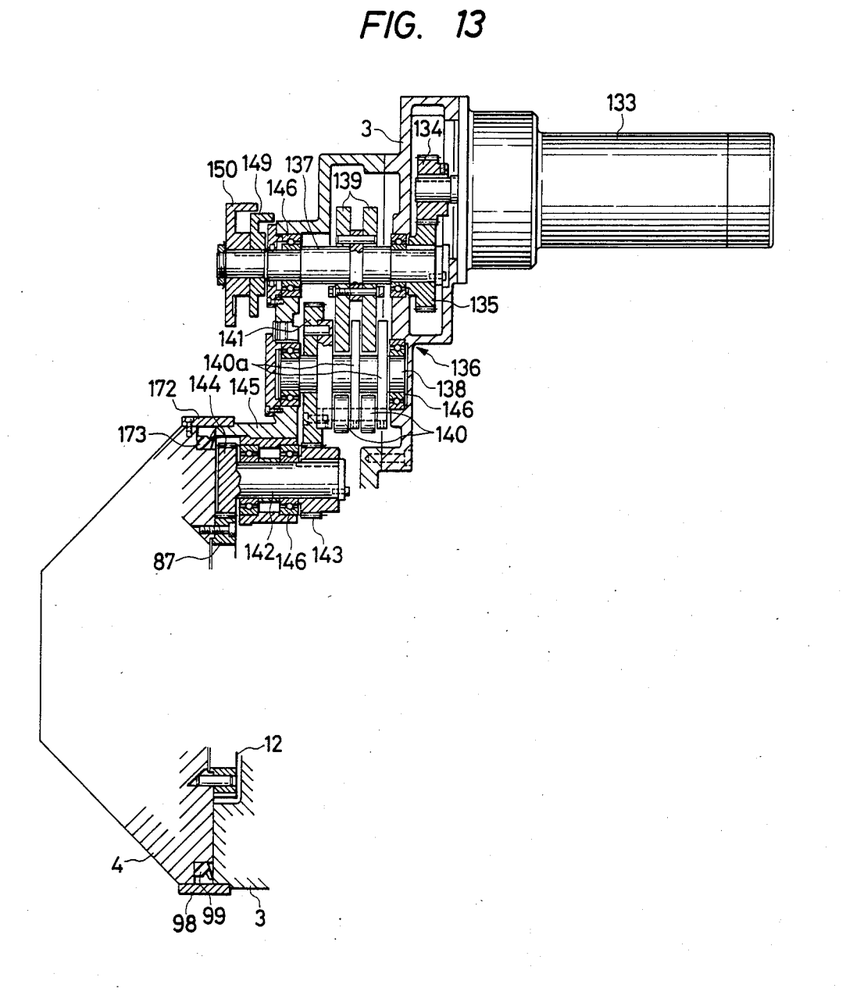
FIG. 13 is a vertical cross section of index-rotating means of teh turret head.

The rotational movement of the turret head 4 is given by a turret motor 133 as a driving source. That is, the turret motor 133 constitutes a part of an index-rotating means, and is attached to the rear surface of the body 3 as shown in FIG. 13. The rotational movement of the motor 133 is transmitted to an input side cam shaft 137 of a parallel index cam 136 through intermediate gears 134 and 135. The parallel index cam 136 is provided with two cams 139 mounted on the cam shaft 137 and is further provided with a plurality of rollers 140 supported by discs 140a at an output shaft 138 so as to be in contact with the outer circumferences of the cams 139. In the embodiment, when the cam shaft 137 is rotated by revolution, the output shaft 138 is caused to stop rotating after rotating by 270 degrees and restricted at that position in the state of stoppage. The rotation of the output shaft 138 is transmitted by a gear 141 to the gear 87 on the turret head 4 side in a decelerated state through gears 143 and 144 mounted on an intermediate shaft 142. The cam shaft 137, the output shaft 138, and the intermediate shaft 142 are rotatably supported by bearings 146 at corresponding portions of the body 3 and a casing 145. A rotational position of the turret head 4 is detected on the basis of the relation of contact between a limit switch 147 on the body 3 side and two dogs 148 attached on an outer circumference and on a diametrical line of a cover 172 of the turret head 4.

Figure 16:
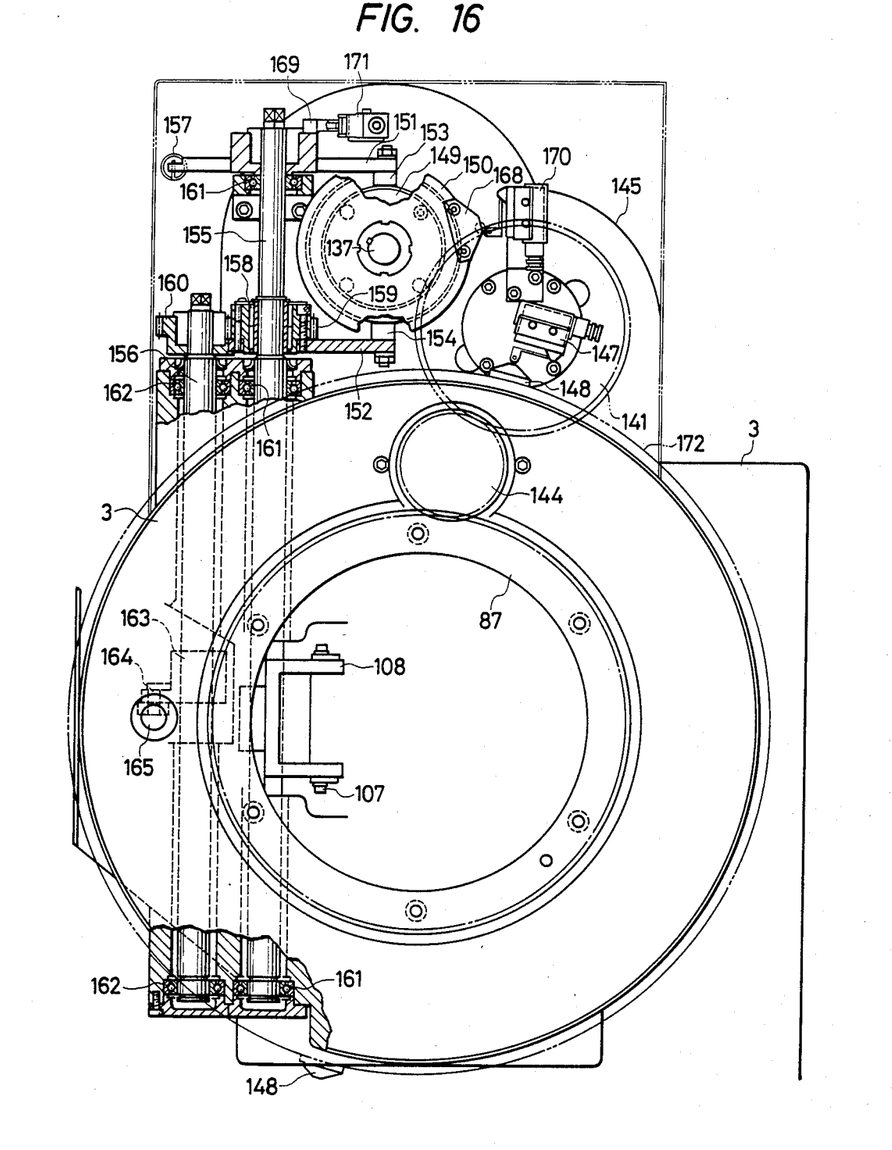
FIG. 16 is a partially broken front view of a part of a cam mechanism.

The cam shaft 137 of the parallel index cam 136 is projected outside from a portion of the casing 145 and two cams 149 and 150 are supported in a rotation-detained state by the projected portion of the cam 136. The cams 149 and 150 may be, for example, end surface cams, and touch a cam follower 153 of an operation lever 151 of clutch means and a cam follower 154 of a positioning lever 152, respectively, at the respective end surfaces of the cams 149 and 150. The one lever 151 is fixed in a rotation-detained state to a shaft 155 and is urged by a pulling spring 157 in the directions so that the cam follower 153 always touches the cam 149. The other lever 152 is rotatably supported on the shaft 155 through by a bearing 158, and a gear 159 integrated with the lever 152 is engaged with a gear 160 of a shaft 156. The rotational positions of the cam 149 and the lever 151 are respectively detected on the basis of the relation of contact between dogs 168 and 169 and limit switches 170 and 171 respectively correspondingly. The shafts 155 and 156 are rotatably supported by bearings 161 and 162 at the opposite ends of the body 3 so as to be parallel to each other and so as to cross the driving shaft 104. The one shaft 155 is connected to the operation lever 108 in a detained state. The other shaft 156 is connected to an operation lever 163 in a rotation-detained state and is engaged with a groove portion of a locate pin 165 through the operation lever 163 and a linking pin 164 provided at the top end of the operation lever 163. The located pin 165 constituting a positioning means together with locate holes 167, is axially movably supported by the body 3 in the direction perpendicular to the bottom surface of the turret head 4, and is arranged so as to be urged by an urging spring 166 in the projecting direction to thereby fit at its end portion into the locate holes 167 on the bottom side of the turret head 4. A dog 177 formed at the rear end portion of the locate pin 165 faces a limit switch 178. The locate holes 167 are provided at two positions so as to correspond to index angels of the two main shafts 81. The annular cover 172 and a sealing member 173 maintain the tightness of the turret head 4 at the outer circumferential portion of the turret head 4 while sliding ont the end surface or the outer circumferential surface of the body 3.

A series of operations will be described in relation to the respective operations of the various portions hereunder. First, in the case of turning the turret head 4 by 180 degrees for indexing, the clamp piston 80 is advanced so as to separate the clamper 84 from the clamp receiver 85 to thereby make the turret head 4 freely rotate about the central shaft 78 and then the turret motor 133 is rotated. In the first step after the turret motor 133 is started, the cams 149 and 150 are rotated by about an angle of 0 through 45 degrees, so that the levers 151 and 152 rotate following the end surfaces of the cams 149 and 150 respectively. Owing to the rotation of the shaft 155 at that time, the operation lever 108 rotates counterclockwise in FIG. 12 so as to separate the clutch member 93 from the clutch member 92 along the spline 105, the both clutch members 92 and 93 being used as the clutch means. At that time, the releaser 109 is also moved backward simultaneously, so that the lock pins 95 reversely operates before the clutch members 92 and 93 have been completely separated from each other to thereby fit into the lock grooves 94 by being urged by the spring 98. Accordingly, the main shaft 81 located in the working position is made to be in the rotation detained state relative to the housing 88.

After the preparatory operation, the parallel index cam 136 drives the driven rollers 140 within a range of 45 through 270 degrees of the rotational angle of the cam shaft 137 so as to rotate the gear 144 so that the turret head 4 is finally rotated by 180 degrees. In the embodiment, the output shaft 138 is arranged to rotate by 270 degrees while the cam shaft 137 is rotated by one revolution, and the 270-degree rotational movement of the gear 141 is accelerated by the gear 143 and transmitted to the gear 87 as accurate rotation of 180 degrees.

Thus, at a point in time when the cam shaft 137 has rotated by 270 degrees, the index-rotation of the turret head 4 have been completed.

The levers 151 and 152 return to the respective initial rotational phases in the latter stage in which the cams 149 and 150 finishes one revolution, that is, in a range of revolution of 270 through 360 degrees. Thus, first, the locate pin 165 is urged by the urging spring 166 so as to be advanced as the operation lever 163 returns so that the top end portion of the locate pin 165 is fitted into the newly indexed locate hole 167, and the turret hed 4 is accurately indexed and made to bein the rotation-detained state. On the other hand, as the operation lever 108 returns, the clutch member 93 is engaged with the clutch member 92 of the main shaft 81 newly indexed into the working position. At the point in time when the pair of clutch members 92 and 93 are engaged with each other, the releaser 109 continues to push the lock pins 95 against the spring 78 so as to separate the lock pins 95 from the lock grooves 94, so that the main shaft 81 located in the working position is made to be freely movable in the inside of the housing 88.

Thus, while the cam shaft 137 is rotate by one revolution, the turret head 4 is rotated by 180 degrees, and the clutch means and the positioning means successively perform necessary engagement, positioning operation, or reverse operations. Thereafter, oil pressure is applied to the inside of the central shaft 78 used as the clamp cylinder in the direction so that the clamp piston 80 is moved backward so as to be in contact with the clamp receiver 85 to thereby make the turret head be in the rotation-detained state about the central shaft 78.

In that state, if the main shaft motor 121 is rotated, the rotary force is transmitted to the driving shaft 104 through the gears 122, 123, and 112 and is further transmitted to the main shaft 81 located in the working position through the clutch members 92 and 93, so that the tool 10a of the tool holder 10 attached to the top end of main shaft 81 is caused to perform predetermined cutting work. In the case of requiring recessing work, the recessing cylinder 114 is operated to advance the piston 115. Accordingly, the recess driving rod 111 and the recess rod 100 touching the recess driving rod 111 are advanced, so that the tool 10a inside the tool holder 100 capable of recessing working is displaced from the center in the eccentric direction so as to be guided to a position at which inner-groove working can be carried out.

During the operation, the machine tool applies feeding movement in the working direction while indexing the main shaft 81 located in the working position into a predetermined position under the numerical control. Such feeding movement of the machine tool side is carried out in parallel to the drive of the parallel index cam 136 in order to reduce waste time.

Thus, when the necessary working is completed, the turret head 4 is returned in the Z-axis direction under the numerical control and then the main shaft motor 121 is automatically stopped. The stopping position at that time is accurately controlled on the basis of the relation of correspondency between the sensor 117 and the dog 118. Then, when the turret motor 133 is started so that the parallel index cm 136 starts to rotate, the shafts 155 and 156 rotate owing to the rotation of the cams 149 and 150, the one clutch member 93 is moved backword, the lock pins 95 are fitted in the lock grooves 94 so as to make the main shaft 81 in the working position be in the rotation-detained state, and succeedingly the locate pin 165 comes out of the locate hole 167 so as to enable the turret head 4 to rotate. At the same time, the clutch members 92 and 93 are separated from each other, so that the main shaft 81 located in the working portion is separated from the driving shaft 104 so as to be rotatable. Thereafter, the output shaft 138 of the parallel index cam 136 starts to rotate, so that the turret head 4 is rotated by 180 degrees similarly to the above case and starts the succeeding indexing operation.

On the other hand, in the stand-by position, the housing 88 and the main shaft 81 are guided on the same axis as that of the unclamp cylinder 124. Of course, the main shaft 81 is in the rotation-detained state because the lock pins 95 are fitted in the lock grooves 94 during rotation of the main shaft 81, so that the main shaft 81 is never caused to face in the arbitrary direction also during rotation of the turret head 4. Thus, the clutch member 92 on the main shaft 81 side is guided between the pair of pawls 131 of the drawer 129 so as to face the pawls 131 at the opposite shoulders of the drawer 129. Then, the main shaft 81 on the working side is rotated by the main shaft motor 121 so as to start new cutting work under the numerical control. In parallel with this operation, the unclamp cylinder 124 is externally supplied with oil pressure so as to advance the piston rod 128 against the compression spring 130, so that the clamp rod 99 is pressed against the tool holder 10. Accordingly, the clamp rod 99 is advanced against the spring 101, the lock balls 103 at the top end of the clamp rod 99 are made to move in the direction away from the center of the clamp rod 99, and the tool holder 10 at that position is ready to be taken off from the socket 90 of the main shaft 81. In unclamping, the unclamp cylinder 124 is movable backward and the drawer 129 is supplied with reaction force of the piston rod 128, so that no force in the thrust direction is exerted onto the housing 88, the bearing 89 in the housing 88, and the like. When the piston rod 128 is moved to the advancing limit, the air paths 132 are communicated to each other, so that the internal air is jetted to the socket 90 through the inside of the clamp rod 99 to thereby blow off dust and the like at the socket 90 to the outside. Thus, the tool holder 10 in the unclamped state in the stand-by position is replaced by a new tool holder 10 required for the succeeding working by an automatic tool exchanger or the like.

Although the parallel index cam 136 is used as means for index-driving the turret head 4 in the above embodiment, the same function can be obtained by another type cam, for example, a barrel index cam or the like. The positioning means and the clutch means are not limited to those in the embodiment illustrated in the drawings but may be substituted by other mechanisms so long as the mechanism have the same functions. Of course, the driving source is not limited to the electric motor but may be a hydraulic motor or the like.

According to the present invention, the following effects can be obtained. The index-rotating means and the positioning means of the turret head, the means for rotationally driving the main shaft, and the like are housed in the body at portions on the turret head side, so that the internal arrangement of the turret head can be made simple and the rotary portions can be made light in weight.

The clutch means are provided between the main shaft and the main shaft driving means, and the rotation-detaining means operation reversely to the engaging operation of the clutches is incorporated integrally with the clutch means, so that the rotation-detaining means is automatically released when the main shaft and the driving shaft are connected to each other, while, on the contrary, the rotation detaining means automatically makes the main shaft be in the rotation detained state when the clutch means are separated from each other. Accordingly, erroneous operations can be prevented from occurring in turning operation of the turret head.

Further, the indexing means, the clutch means, the detaining means, the positioning means, and the like, of the turret head are driven by the three cam mechanisms, and those cam mechanisms are operated, finally, by one driving source in the mechanically synchronized state, so that there occurs no trouble such as out-of-synchronization which occurs under electric control, and further a series of necessary operations can be surely carried out at a high speed. Particularly, a series of operations are mechanically linked, so that electric control and switches for confirming the operations are little required. Accordingly, the electric control system can be made simple.

The movement of the series of operations is set by the cams, so that it is easy to set ideal movement characteristics by setting the outline curves of the cams. Accordingly, the index-rotation of the turret head and the like can be carried out at a high speed with no shock or the like.

Further, the series of operations are mechanically linked, means for the transmission and reception of electric signals are eliminated, and no delay in signal processing occurs, so that in view of those points, it is made possible to make the speed higher.

We claim:

1. A turret apparatus with an automatic tool changer characterized in that a turret head is rotatably provided on a body, said turret head having two main shafts arranged with an interval of 180 degrees about a rotary shaft, said two main shafts being disposed to form an angle of intersection of 90 degrees therebetween, a rotational axis of said turret head being horizontally directed, and each of said two main shafts being disposed to form an angle of intersection of 45 degrees with respect to said rotary shaft, one of said main shafts being in a working position for working on a workpiece when the other main shaft is in a stand-by position remote from said workpiece in relation to said working position, and an automatic tool changing arm and a tool stocker are arranged adjacent said other of said main shafts which is in the stand-by position, wherein said turret apparatus further comprises a vertical guide for vertically guiding said tool stocker, means for moving said tool stocker and said tool changing arm together with said turret head; means for index-rotating said turret head; means for positioning said turret head; driving means for rotatably driving said main shafts; clutch means disposed between said driving means and said main shaft; rotation-detaining means for preventing rotation of said one of said main shafts in said working position; means for actuating said rotation-detaining means in response to deactuation of said clutch means and for deactuating said rotation-detaining means in response to actuation of said clutch means; cam means for operating said index-rotating means, said clutches and rotation-detaining means, and said positioning means; a cam shaft on which said cam means is mounted; and a driving source for driving said cam shaft to rotate.

2. The turret apparatus of claim 1, wherein said moving means comprises: a frame for supporting said automatic tool changing arm and said tool stocker, an indexing driving source disposed in front of said frame for indexing said tool stocker, means for making said frame move integrally with said turret head, whereby said tool changing arm and said tool stocker are movable with said head.

3. A turret apparatus as claimed in claim 1, wherein said cam means comprises three cams for operating said index-rotating means, said clutches and rotation-detaining means, and said positioning means, respectively.

4. A turret apparatus with an automatic tool changer characterized in that a turret head is rotatably provided on a body, said turret head having two main shafts arranged with an interval of 180 degrees about a rotary shaft, said two main shafts being disposed to form an angle of intersection of 90 degrees therebetween, a rotational axis of said turret head being horizontally directed, and each of said two main shafts being disposed to form an angle of intersection of 45 degrees with respect to said rotary shaft, one of said main shafts being in a working position for working on a workpiece when the other main shaft is in a stand-by position remote from said workpiece in relation to said working position, and an automatic tool changing arm and a tool stocker are arranged adjacent said other of said main shafts which is in the stand-by position, wherein said turret apparatus further comprises means for index-rotating said turret head, said turret head having a plurality of main shafts disposed at regular intervals, means for positioning said turret head, means for rotatably driving said main shafts, clutch means disposed between said means for rotatably driving and said main shafts, and means for detaining rotation of said main shafts, said means for detaining rotation being arranged to operate reversely to said clutch means.

5. A turret apparatus as claimed in claim 4, wherein the automatic tool changer is adapted for changing a tool mounted on the one of said shafts which is in the stand-by position.

* * * * *